J. W. FRITCH & D. E. HOOPES.
CARD PUNCHING DEVICE.
APPLICATION FILED OCT. 11, 1916.

1,229,057.

Patented June 5, 1917.
7 SHEETS—SHEET 1.

WITNESSES

INVENTORS
JOHN W. FRITCH,
DELIA E. HOOPES,
BY
ATTORNEYS

J. W. FRITCH & D. E. HOOPES.
CARD PUNCHING DEVICE.
APPLICATION FILED OCT. 11, 1916.

1,229,057.

Patented June 5, 1917.
7 SHEETS—SHEET 4.

WITNESSES

INVENTORS
JOHN W. FRITCH,
DELIA E. HOOPES.
BY
ATTORNEYS

UNITED STATES PATENT OFFICE.

JOHN WM. FRITCH AND DELIA E. HOOPES, OF WASHINGTON, DISTRICT OF COLUMBIA, ASSIGNORS OF ONE-THIRD TO WILLIAM H. HOOPES, OF WASHINGTON, DISTRICT OF COLUMBIA.

CARD-PUNCHING DEVICE.

1,229,057. Specification of Letters Patent. Patented June 5, 1917.

Application filed October 11, 1916. Serial No. 125,100.

*To all whom it may concern:*

Be it known that we, JOHN W. FRITCH and DELIA E. HOOPES, citizens of the United States, and residents of Washington, in the District of Columbia, have invented new and useful Improvements in Card-Punching Devices, of which the following is a specification.

Our invention relates to improvements in card punching devices, and it consists in the combinations, constructions and arrangements herein described and claimed.

An object of our invention is to provide a device for punching cards, such as those which are used for statistical data, as for instance in compiling statistics for the census or, for other similar uses.

A further object of our invention is to provide a card punching device in which the cards are moved automatically into position, are then punched and are automatically removed and delivered to a receiver.

A further object of our invention is to provide a device for punching cards, in which the punching operation itself is done by electrical means, said electrical means being set in operation by keys corresponding to the numbers to be punched.

Other objects and advantages will appear in the following specification, and the novel features of the invention will be particularly pointed out in the appended claims.

Our invention is illustrated in the accompanying drawings forming a part of this application, in which.

In carrying out our invention we provide a main frame having sides 1. This frame may be supported by legs 2 or in any suitable manner. At one end of the frame is a receptacle 3 having cards 4, which have been punched.

Journaled in the side members 1 of the device, is a drive shaft 5 which is provided at one end with a slidable sleeve 6 bearing a clutch member 7 which is arranged to engage the clutch member 8 of a pulley 9 which is loosely mounted on the sleeve 6. The pulley 9 is constantly driven by means of a belt 10 from any suitable source of power, not shown. Mounted on the shaft 5 is a sprocket wheel 11 over which an endless sprocket chain 12 runs, the chain 12 passing around a sprocket 13 on a shaft 14 at one end of the frame, (see Fig. 1). The shaft 14 bears two sprocket wheels 15 and 16 respectively. At the opposite end of the frame is a shaft 17 which bears two sprocket wheels 18 and 19 respectively. An endless chain 20 runs over the sprockets 15 and 18 on one side of the device, while a similar endless chain 21 runs over the sprockets 16 and 19 on the opposite side of the device.

Figure 1:
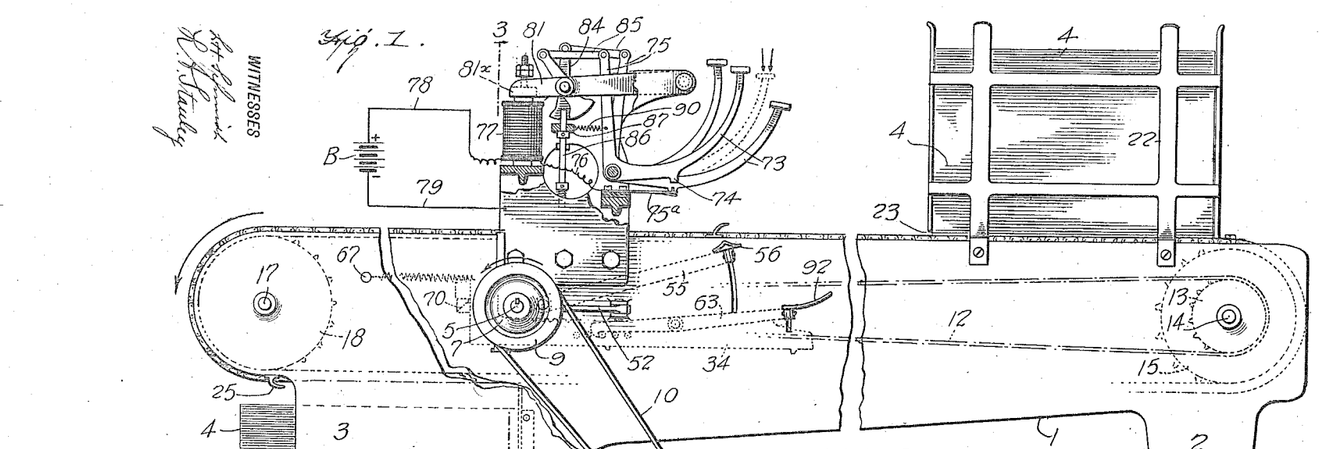
Figure 1 is a side elevation of the device, partly broken away.

As will be seen from Fig. 1 there is a card receptacle 22 which is secured to the top of the frame near the end bearing the sprocket wheels 15 and 16. This receptacle has an opening 23 in one side near the bottom, said opening being of slightly greater height than the thickness of one card, but being less in height than the thickness of two cards. The bottom of the receptacle 22 is formed by a table 24 which extends the length of the machine and upon which the cards are carried in the manner hereinafter described.

Figure 17:
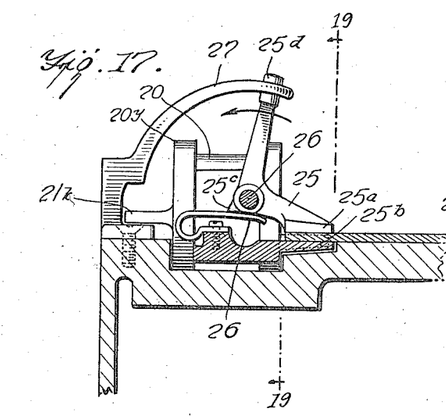
Fig. 17 is a transverse section of the card conveying chain on the line 17—17 of Fig. 5.
Figure 18:
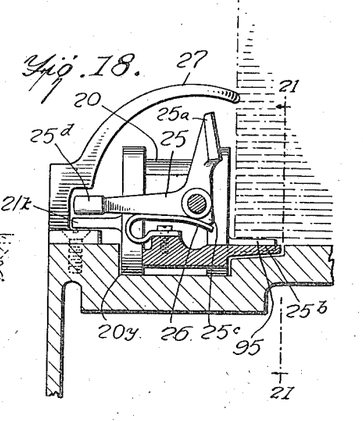
Fig. 18 is a view similar to Fig. 17 showing the parts in a different position.
Figure 20:
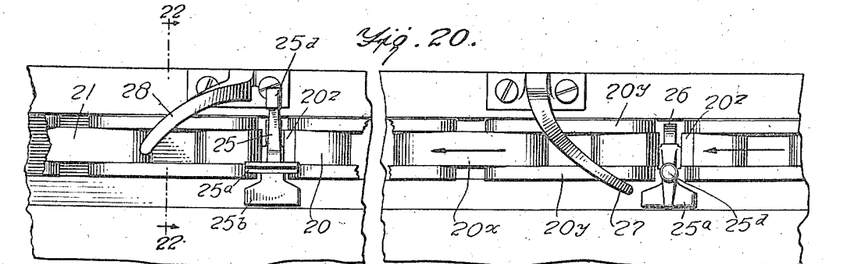
Fig. 20 is a plan view of the chain shown in Fig. 19.

Referring now particularly to Fig. 20, it will be seen that each of the sprocket chains 20 and 21 consists of solid links, such as those shown at $20^x$, held together by a pair of thinner links $20^y$ pivotally secured to the adjacent solid links. At certain portions of the chain one of these solid links $20^x$ is slotted as shown at $20^z$ to provide a housing for an L-shaped gripping member 25, each of these L-shaped gripping members 25 being pivoted at 26 in the slot. The members 25 are provided with a jaw $25^a$ which coöperates with a rigid jaw $25^b$ to grip the cards in the manner hereinafter explained. The member 25 is provided with a lug $25^c$ which engages the spring 26 in such a manner that the spring will hold it securely in the closed position, as shown in Fig. 17, or the open position as shown in Fig. 18. One end of the member 25 is made cylindrical as shown at $25^d$ and is arranged to engage actuating cams such as those shown at 27, to open the jaws $25^a$ and $25^b$, i. e., to move the gripping device from the position shown in Fig. 18 to that shown in Fig. 17. The end $25^b$ is also arranged to engage cams 28 which close the jaws or move them in the opposite direction. In such movement the member 25 is moved slowly at first until the extension $25^c$ is passed, when the spring 26 will throw the member 25 either in one direction or the other, depending upon which way the member is moved, and will retain it in its extreme position.

Figure 5:
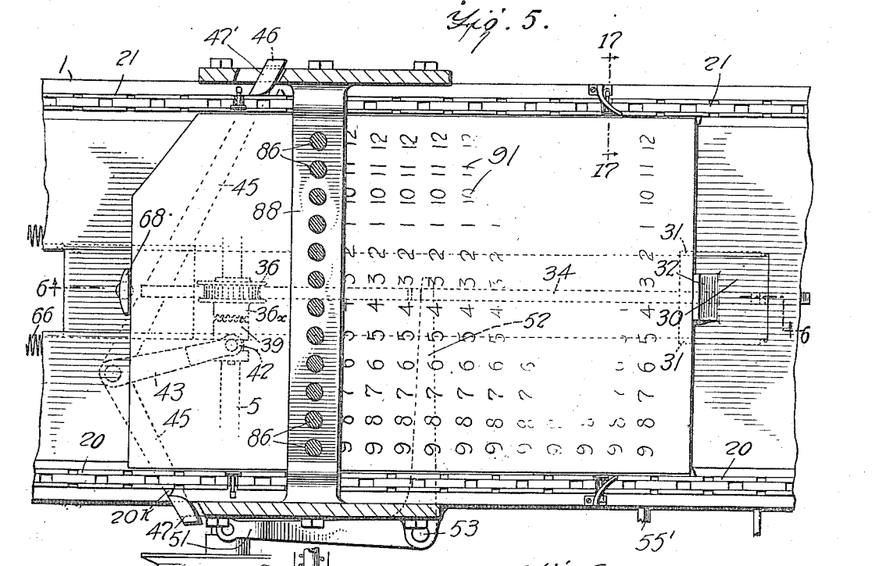
Fig. 5 is a horizontal section on the line 5—5 of Fig. 3.
Figure 6:
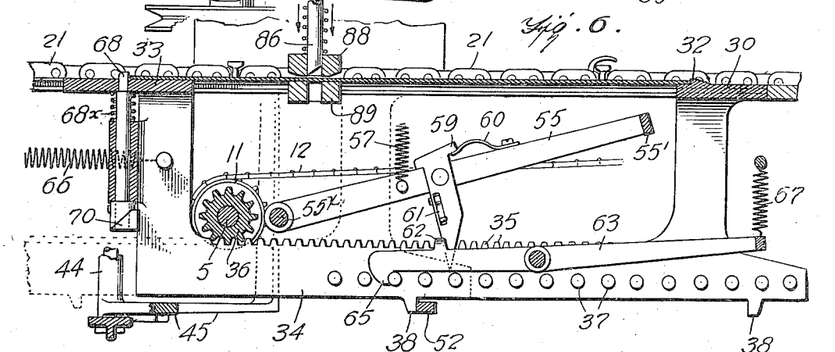
Fig. 6 is a central longitudinal section on the line 6—6 of Fig. 5.
Figure 7:
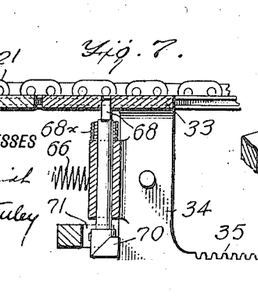
Fig. 7 is a detail section showing the card stop in its depressed position.

The table 24 is provided with a longitudinal slot of rectangular shape. This slot is indicated at 29. As will be seen from Fig. 3, the walls of the slot are grooved. A carriage is provided which is adapted to be reciprocated in the slot 29. This carriage is shown in Fig. 6. It consists of a portion 30 which is provided with tongues 31 (see Fig. 5), arranged to enter grooves in the walls of the slot 29. The upper surface of the portion 30 of the carriage is flush with the table, as shown in Fig. 6. This portion of the carriage bears a stop member 32 which has one side vertical and which has a slanting side, as clearly shown in Figs. 5 and 6. Another portion 33 of the carriage is connected to the portion 30 by means of a U-shaped frame 34, this frame having on its central portion a rack 35 arranged to engage a pinion 36 loosely mounted on the shaft 5. The frame is also provided with a series of pins 37. At the under side of the carriage frame are stop members 38. As will be seen from Figs. 3 and 9 the pinion 36 is provided with a clutch member $36^x$ arranged to engage a clutch member 39 which is slidably mounted on the shaft 5, being feathered to it at 40. The clutch member 39 is provided with a groove 41 arranged to receive the yoke 42 at the end of an arm 43. This arm 43 is in fact, integral with a clutch operating mechanism which consists of a sleeve 44, (see Fig. 10) which bears the arm 43 at one end and which is connected with the arms 45 and $45'$ at the other end. The arms 45 and $45'$ have lateral extensions 46 and $46'$ bearing inturned stop members 47 and $47'$ respectively. The sleeve 44 is pivotally mounted on a pin 48 carried by a bracket 49 secured to the frame of the machine. It is obvious that when either of the stop members 47 or $47'$ is moved, the arm 43 is moved and the clutch member 39 is actuated either to bring the clutch members 39 and 36 into engagement or out of engagement, depending upon which stop member is operated.

Figure 9:
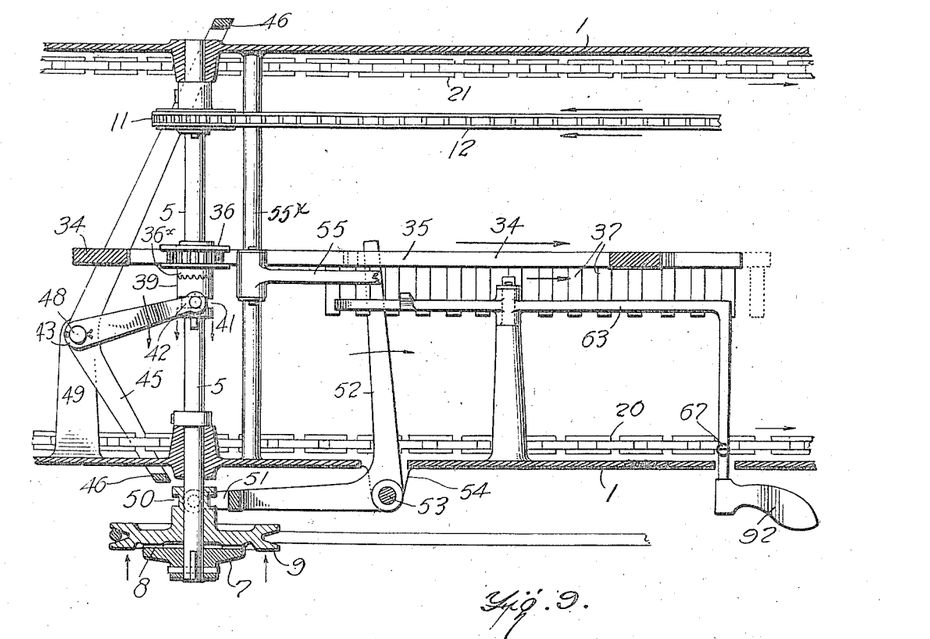
Fig. 9 is a horizontal section on the line 9—9 of Fig. 3.
Figure 10:
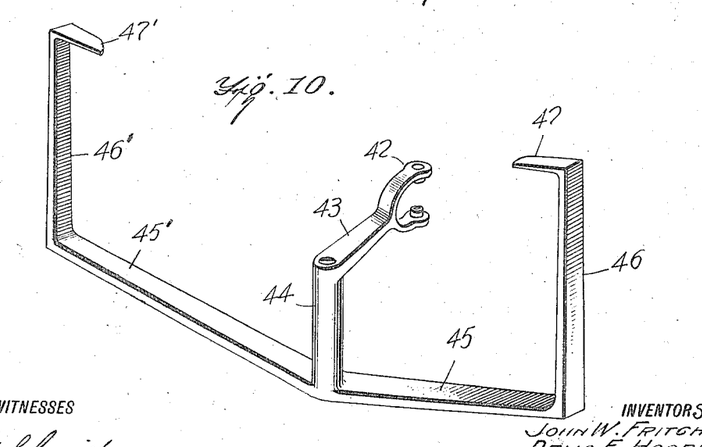
Fig. 10 is a detail perspective view of the auxiliary clutch operating means.
Figure 11:
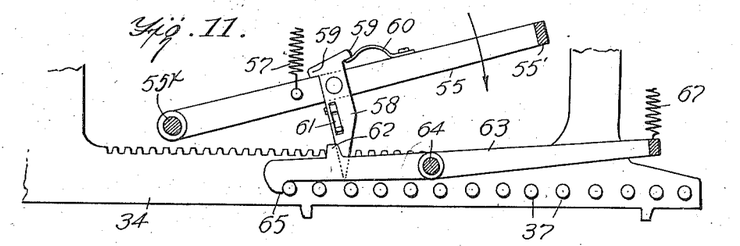
Fig. 11 is a side view of a portion of the spacing mechanism showing the parts in one position.
Figure 12:
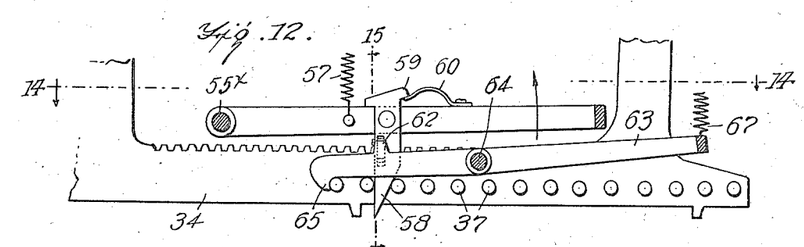
Fig. 12 is a view similar to Fig. 11 showing the parts in another position.
Figure 13:
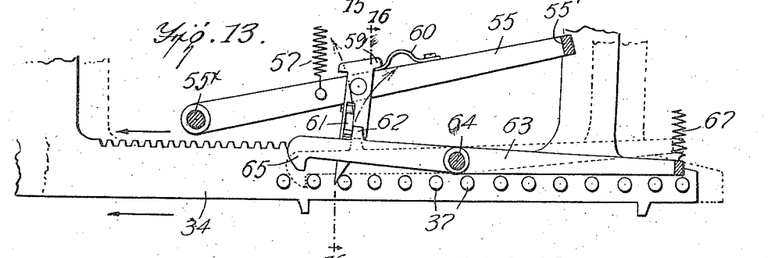
Fig. 13 is a view similar to Fig. 12 showing the parts in a third position.
Figure 14:
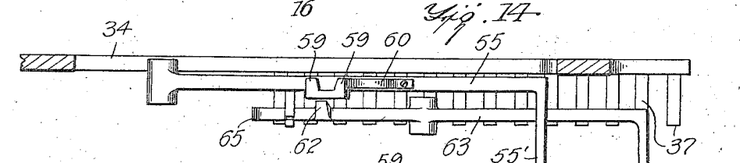
Fig. 14 is a horizontal section on the line 14—14 of Fig. 12.

The means for moving the pulley 9 so that its clutch member 8 engages the clutch member 7 on the shaft 5, is best shown in Fig. 9. To this end the hub of the pulley 9 is grooved as shown at 50, to receive the yoke 51 of the bell crank lever 52 which is pivotally mounted at 53 on the bracket 54 and whose free arm extends inwardly into the path of the lugs 38 of the carriage portion 34. The shifting of the pulley is accomplished by the movements of the carriage, as will be explained later.

Figure 15:
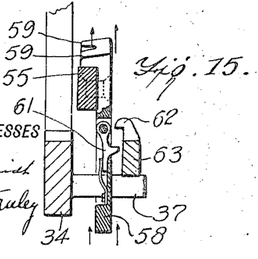
Fig. 15 is a transverse section on the line 15—15 of Fig. 12.
Figure 16:
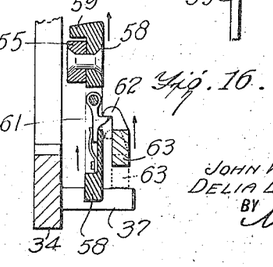
Fig. 16 is a section along line 16—16 of Fig. 13.

The step by step movement of the carriage in shifting a card from a given position in which certain data has been punched from one column, or row to another position where data may be punched in the next column or row, is best illustrated in Figs. 11 to 14 inclusive. In these figures we have shown a lever 55 which is pivoted at $55^x$ and which has an end $55'$ which is bent laterally and terminates in a key 56 (see Fig. 2) at the side of the machine. The lever is normally held in the upper position by means of the spring 57, which bears a loosely pivoted pawl 58 having inwardly turned flanges 59 (see Figs. 15 and 16) which are arranged to extend over the lever. A spring 60 on one side of the pawl 58 engages one of these flanges 59 so as to bring the other into engagement with the lever and thus hold the pawl 58 normally in the position shown in Fig. 11. The pawl 58 bears a spring pressed pivoted locking dog 61 (see Figs. 15 and 16), which is arranged to engage the hooked flange 62 of the release lever 63 when the pawl 58 moves up, but which will ride over the end of the hook 62 when the pawl moves down. The release lever 63 is pivoted at 64 and is provided with a hook 65 arranged to engage the pins 37 so as to prevent the return of the carriage unless it is released to permit such return in the manner hereinafter explained.

Figure 2:
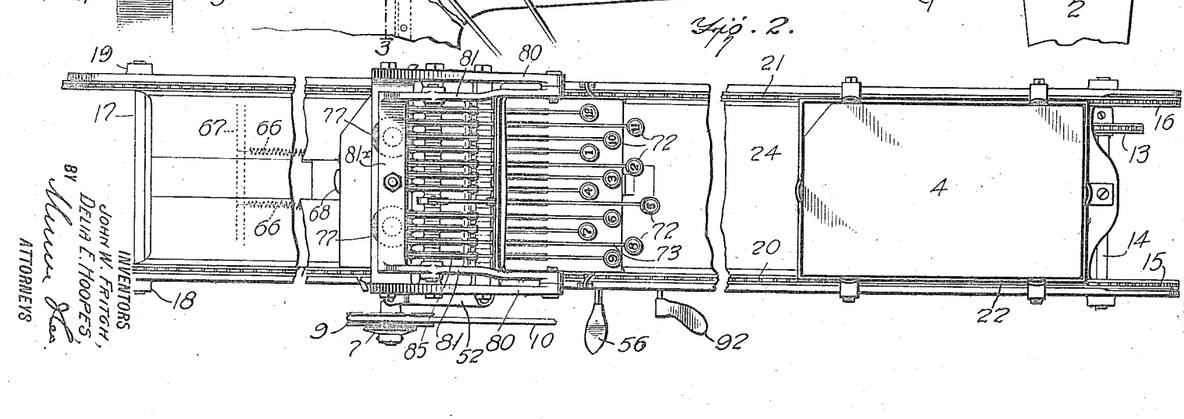
Fig. 2 is a plan view.

The carriage itself is normally under the tension of springs 66 which are fastened to a cross bar 67 (see Figs. 2 and 6). Assuming that the carriage is under spring tension, the step by step movement is accomplished as follows: With the apparatus in the position shown in Fig. 11 the key 56 is pressed downwardly carrying the lever 55 and also the pawl 58. The latter is provided with a wedge-shaped end which enters between two pins 37. The downward movement of the dog 61 (see Figs. 15 and 16), will permit the latter to ride over the hook flange 62 of the release lever 63. Now on relieving the pressure of the key 56, the spring 57 will draw the lever 55 upwardly. As the upward movement continues the release lever will be lifted against the tension of the spring 67 because of the engagement of the dog 61 with the flange 62. The carriage will then move forward swinging the pawl 58 into the position shown in Fig. 13 and compressing the spring 60. This movement will be cushioned by the spring. As the lever 55 rises further, the dog 61 will be disengaged from the hook 62 because of the fact that the dog is moving in the arc of a circle around the axis of the pivot 56 as a center, while the hook 62 is moving around the center 64. As soon as the release lever is disengaged, it will return to its normal position by means of the spring 67, while the lever 55 will continue its upward movement. The adjustment is such that the release lever 63 is brought into position to engage the succeeding pin 37, but the lower end of the pawl 58 leaves the pin which engages it. The result is that the carriage is stepped forward without a jar and this tends to render the movement noiseless.

Figure 8:
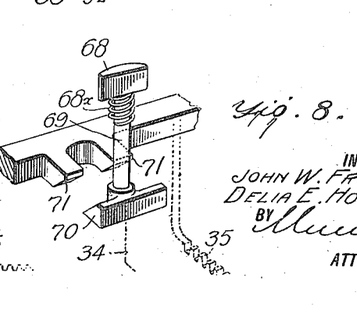
Fig. 8 is a detail perspective view of the card stop and a portion of the mechanism coöperating therewith.

Secured to the carriage is a spring pressed stop 68 like that shown in Fig. 8. This stop is on the end of the spindle 69 which bears at its bottom a wedge-shaped shoe 70. Carried by the frame of the device are the cam members 71, these cam members being arranged to engage the shoe 70, and to force it downwardly against the tension of the spring 68$^x$ so as to bring the upper end of the stop member 68 below the surface of the portion 33 of the carriage. This will only occur when the carriage reaches its extreme forward position i. e. at the left end of its travel, (see Fig. 1). When the carriage is moved in the opposite direction then the shoe 70 will clear the cam members 71 and allow the stop member to rise.

Figure 3:
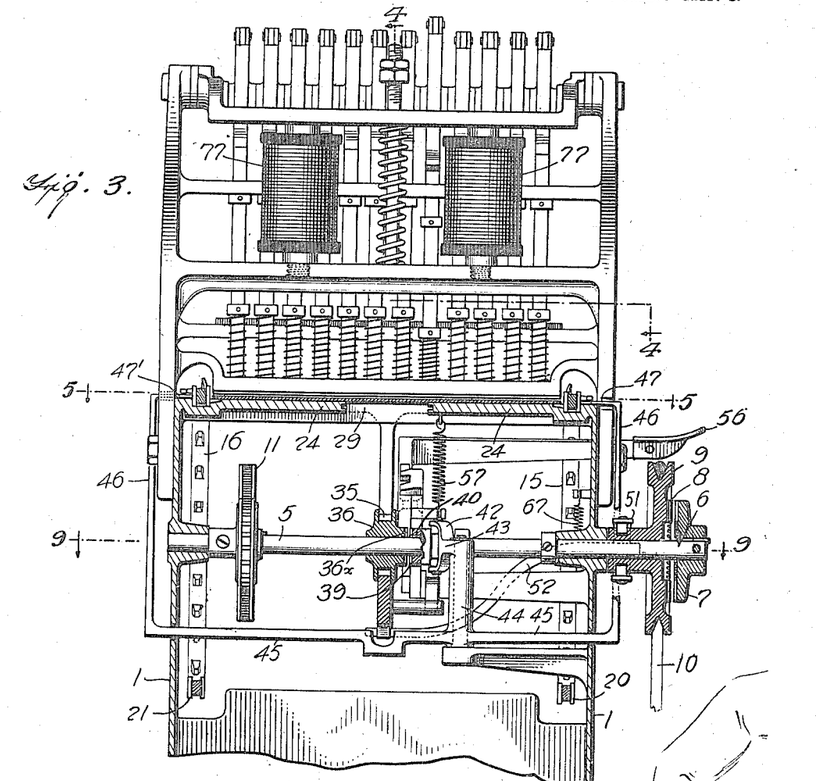
Fig. 3 is a transverse section on the line 3—3 of Fig. 1.
Figure 4:
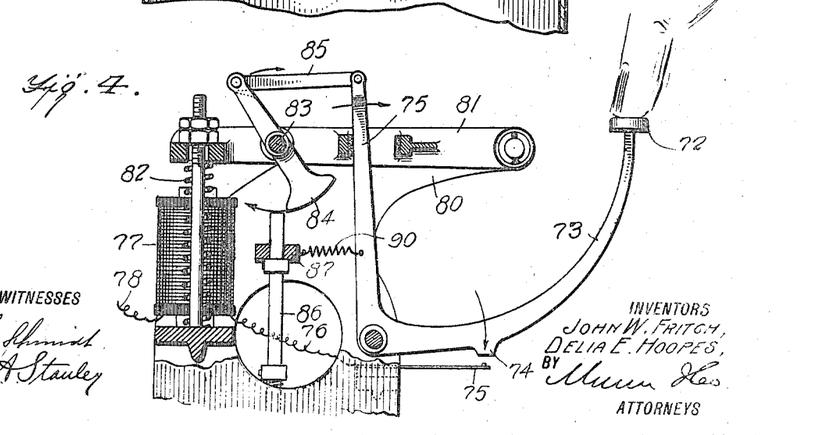
Fig. 4 is a section on the line 4—4 of Fig. 3.

As stated before, this device has a keyboard. The operation of the keys will cause the electro-magnetic apparatus to be energized, which will then complete the punching operation. The means by which this is done is best shown in Figs. 1, 3 and 4. In Fig. 4 it will be seen that each key 72 is at the end of a bell-crank lever 73 which is provided with a contact portion 74 arranged to engage a spring contact 75. As will be seen from Fig. 1 this spring contact is connected with the conductor 76 leading to the magnet 77. This is preferably of the double pole type, as shown in Fig. 3. The magnet in turn is connected by the conductor 78 with the battery B, the opposite side of the battery being connected by conductor 79 to the frame of the device, or in other words, the conductor 79 is grounded on the frame. As will be seen from Figs. 2 and 4, the frame is extended to form brackets 80 there being pivotally mounted at the end of the brackets a U-shaped frame 81 having a central connecting member 81$^x$ which forms an armature for the magnet 77. Normally the armature is held away from the magnet by means of a spring 82, but on the closing of the circuit by any key the magnet will be energized and will pull downwardly on the armature.

Pivotally mounted on a shaft 83 extending between the side members 81 of the frame, is a series of arms such as that shown at 84, there being one of these arms for each of the numbers or keys. One end of these arms is connected by means of a link 85 to the end of the key lever 73. Associated with each arm 84 is a spring pressed plunger 86, this plunger being disposed in upper guides 87 and being arranged to extend through lower guides 88, (see Fig. 6). A die 89 is secured to the frame of the machine and has openings registering with the plungers.

In order to operate any particular plunger, the key 72 corresponding to the plunger is pressed and a circuit is established when the contacts 75 and 74 are closed. The contacts 74 and 75 are spaced apart far enough to permit the arm 84, which in normal position such as that shown in Fig. 4, is clear of its associated plunger 86 to swing over the plunger as shown in Fig. 1. Now when the circuit is closed, the magnet 77 will cause the armature to move downwardly thereby moving the arms 84, and that arm which is brought into position by the key will press its corresponding plunger downwardly so as to perforate the card. On the retraction of the key the circuit will be broken and the armature will retract while the spring 90 associated with each key lever will restore the lever and hence the arm 84 to normal position, as shown in Fig. 4.

Figure 24:
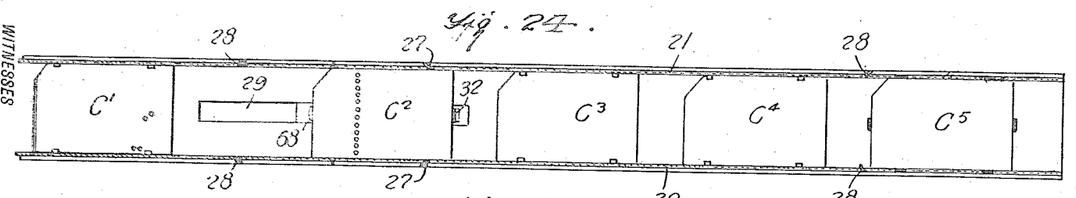
Fig. 24 is a diagrammatic plan view showing the machine at rest and the card in position to be punched.

From the foregoing description of the various parts of the device, the operation thereof may be readily understood. Consider Fig. 24; this figure shows five cards in positions which they will assume during the operation of the device, these cards being indicated at $C^1$, $C^2$, $C^3$, $C^4$ and $C^5$. Let us assume that the card $C^1$ has already been punched and has been moved forwardly, and that the card $C^2$ is in position to be punched. It will be shown later how these cards are brought to the punching position. The operator presses one of the keys and the card is punched by the electro-magnetic means already described. He now depresses the key 56 (see Fig. 2), and this moves the carriage forwardly a space represented by the distance between the adjacent pins 37 in the manner described. The plungers 86 are now in registration with the adjacent row or column of figures 91 (see Fig. 5), so that the depression of the key will cause the perforation of the card in this row or column. As many rows or columns may be punched as desired. When the operator is through punching the card he depresses the release lever 92 (see Fig. 2), which operates the lever 63, and the carriage moves forwardly bringing the shoe 70 (see Fig. 8) into engagement with the cam members 71, withdrawing the stop member 68. The movement of the carriage is limited by the engagement of the stop 38 at the right of Fig. 6 with the lever 52. This will move the lever 52 so as to throw the pulley 9 (see Fig. 9) into engagement with the clutch member 7. Shaft 5 will now be turned and since the clutch 39 is in engagement with the clutch member $36^x$, the gear or pinion 36 will be turned so as to move the carriage against the tension of the spring to the rear, stretching the springs 66. The turning of the shaft 5 will cause the movement of the chains 20 and 21 through the medium of the sprocket 11, sprocket chain 12, and sprockets 13 and 15, see Fig. 1. This will cause forward movement of the cards toward the carriage.

Figure 19:
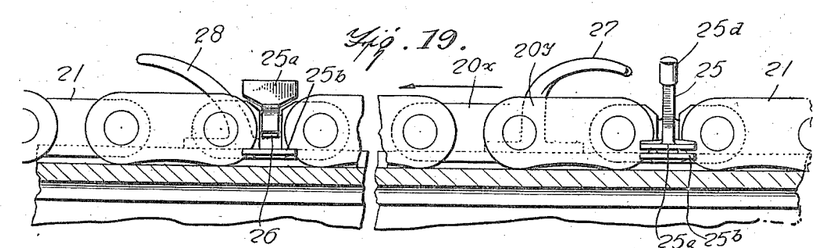
Fig. 19 is a section along the line 19—19 of Fig. 17.
Figure 25:
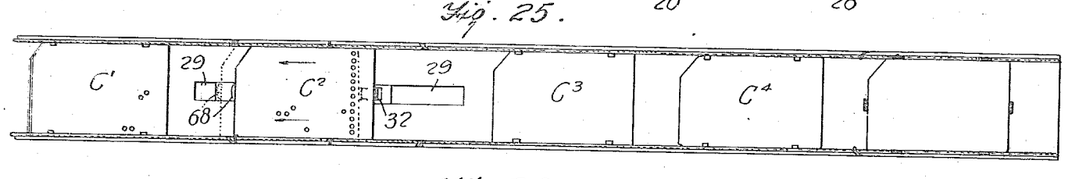
Fig. 25 is a view similar to Fig. 24 showing the parts in another position.
Figure 26:
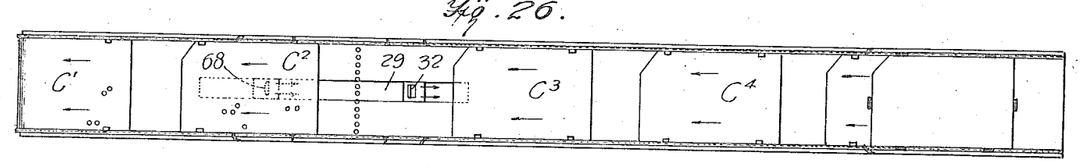
Fig. 26 is a similar view showing the parts in a third position.

When the stop member 38 at the left (see Fig. 6) reaches the lever 52, it will be swung in the opposite direction and the movement of the shaft 5 will be stopped. Simultaneously with the stopping of the shaft 5 the clutch members 39 and $36^x$ will be disengaged by the engagement of a lug $20^k$ (see Fig. 5) carried by the chain 20, with the end 47 of the clutch operating mechanism, illustrated in detail in Figs. 9 and 10. This will turn the arm 43 so as to move the clutch members 39 and $36^x$ apart and thereby freeing the pinion 36 so that it may be revolved idly during the forward movement of the carriage step by step, as the punching operation is conducted. The carriage is held in its retracted position by the engagement of the hook 65 of the release lever 63 with the pins 37. During the forward movement of the carriage it carries the card forward. Fig. 25 shows the position of the card during this forward movement. When the carriage has reached the limit of its forward movement and has begun its return, then a pair of gripping devices 25 carried by the chains 20 and 21 reach the cam members 28 and are caused to grip the card in the manner explained in connection with Figs. 19 and 20. During the rearward movement of the carriage the card is drawn forward by these gripping devices, and when the next pair of gripping devices reaches the same cam members 28 they also grip the card so that the card is firmly held by four gripping devices, two on each side.

The carriage returns while a card in the rear of the one just punched is advancing to meet it. The forward edge of the card rides over the stop 32 until it reaches the spring stop 68, whereupon the rear end of the card will drop down behind stop 32 in position on the carriage to be punched. During the forward movement of the card upon the carriage, the cam members 27 will be encountered. This will open the jaws of the gripping devices thus releasing the card from the chains while it is on the carriage. The punching operation is now carried out again and when the carriage reaches the limit of its forward movement the lug 38 at the right of Fig. 6 engages the lever 52 thus again throwing in the clutch members 7 and 8 operating the shaft 5 and the chains. At this point the lug $21^k$ on the chain 21 engages the end 47 of the clutch operating mechanism bringing the clutch members 39 and $36^x$ (see Fig. 9) into engagement, thereby turning the pinion 36 causing the rearward movement of the carriage. It will be understood, of course, that the carriage does not attain its full forward movement until the release lever has been pressed.

The cards as they are punched are firmly gripped by the gripping devices as explained, and are carried around above the receptacle 3. It will be observed that at the upper left hand end of this receptacle (see Fig. 1) is a cam member 25 like that shown in Figs. 17 and 18. A similar cam member is disposed on the opposite side. These cam members open the jaws of the gripping device as the chain brings the gripping members into engagement with the cams. It will be thus seen that the forward portion of the card is released and then the rear portion is subsequently released, whereupon the card drops into the receptacle 3, the cards being arranged in stacked relation.

Figure 21:
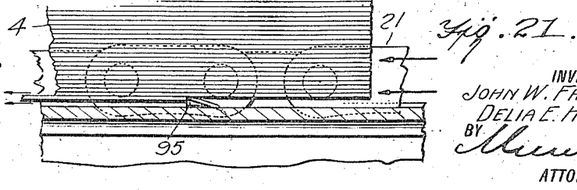
Fig. 21 is a section on the line 21—21 of Fig. 18.
Figure 22:
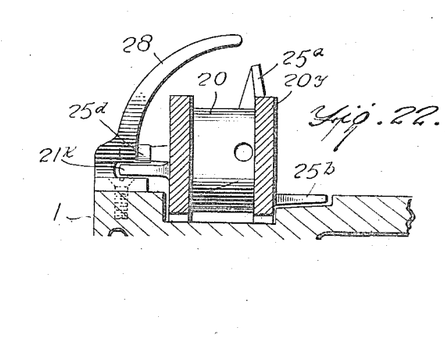
Fig. 22 is a transverse section through the chain showing the means for resetting the card gripping device.
Figure 23:
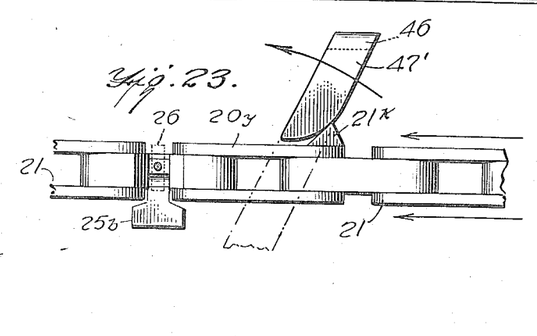
Fig. 23 is a plan view of a portion of the chain showing the means for actuating one of the clutch levers.

The jaws of the gripping devices remain open and pass around the sprockets 15 and 16 and also pass the receptacle 3. When the jaws are open they are out of the way of the stack of cards, as shown in Fig. 18; when they are closed they are in position to grip the card. At various intervals the chains are provided with lugs 95 (see Fig. 21), these lugs being of sufficient height to push out the bottom card of the stack in the receptacle 3 as the chains move along. Referring again to Fig. 24, it will be seen that just outside of the receptacle 22 are cam members 28 which engage the gripping devices and close them upon the cards as the latter are moved forward. The lugs 95 are spaced apart along the chain at such intervals as to remove the cards from the receptacle 22 in regular succession and at such intervals as to bring them in proper position on the carriage.

It will thus be seen that we have provided a device in which the cards are automatically fed from the receiver and automatically moved forward into the position to be punched, with the step by step movement which is controlled by the operator and brings the apparatus in position to be automatically actuated so as to cause the further forward movement of the card to be accomplished automatically. The operator does not have to pull the card from the machine or to insert a new one, the punched card is automatically delivered to the receiver and is deposited upon the pile of cards in regular order.

We claim:

1. A card punching machine comprising a table, an endless flexible member having a portion arranged to move along the top of the table, a card receptacle, means carried by said endless flexible member for extracting the cards one at a time from the receptacle, means carried by said flexible member for gripping the extracted card, a plurality of plungers, means for driving the endless flexible member to convey the card toward the plungers, means for automatically stopping the movement of the endless flexible member when the card has reached a predetermined position with respect to the plungers, means for automatically releasing the card from the endless flexible member, means for operating the plungers at will to punch the card, and means for manually effecting a step by step movement of the card.

2. A card punching device comprising a table having an opening, a carriage movable within the opening and having its top flush with the top of the table, an endless flexible member having a portion arranged to move along the top of the table, a card receptacle, means carried by the endless flexible member for extracting cards one at a time from the receptacle, means carried by said flexible member for gripping the extracted card, means for driving the endless flexible member, means for moving the carriage toward the receptacle, means for automatically stopping the movement of the carriage, and means for automatically stopping the movement of the endless flexible member when the card is in the position above the carriage.

3. A card punching device comprising a table having an opening, a carriage movable within the opening and having its top flush with the top of the table, an endless flexible member having a portion arranged to move along the top of the table, a card receptacle, means carried by the endless flexible member for extracting cards one at a time from the receptacle, means carried by said flexible member for gripping the extracted card, means for driving the endless flexible member, means for moving the carriage toward the receptacle, means for automatically stopping the movement of the carriage, means for automatically stopping the movement of the endless flexible member when the card is in the position above the carriage, and means for automatically releasing the card from the endless flexible member and depositing it upon the carriage.

4. A card punching device comprising a table having an opening, a carriage movable within the opening and having its top flush with the top of the table, an endless flexible member having a portion arranged to move along the top of the table, a card receptacle, means carried by the endless flexible member for extracting a card one at a time from the receptacle, means carried by said flexible member for gripping the extracted card, means for driving the endless flexible member, means for moving the carriage toward the receptacle, means for automatically stopping the movement of the carriage, means for automatically stopping the movement of the endless flexible member when the card is in the position above the carriage, means for automatically releasing the card from the endless flexible member and depositing it upon the carriage, and means for manually effecting a step by step movement of the carriage forwardly.

5. A card punching device comprising a table having an opening, a carriage movable within the opening and having its top flush with the top of the table, an endless flexible member having a portion arranged to move along the top of the table, a card receptacle, means carried by the endless flexible member for extracting a card one at a time from the receptacle, means carried by said flexible member for gripping the extracted card, means for driving the endless flexible member, means for moving the carriage toward the receptacle, means for automatically stopping the movement of the carriage, means for automatically stopping the movement of the endless flexible member when the card is in the position above the carriage, means for automatically releasing the card from the endless flexible member and depositing it upon the carriage, means for manually effecting a step by step movement of the carriage forwardly, and means for automatically starting the movement of the endless flexible member when the carriage has reached a predetermined position.

6. A card punching device comprising a table having an opening, a carriage movable within the opening and having its top flush with the top of the table, an endless flexible member having a portion arranged to move along the top of the table, a card receptacle, means carried by the endless flexible member for extracting a card one at a time from the receptacle, means carried by said flexible member for gripping the extracted card, means for driving the endless flexible member, means for moving the carriage toward the receptacle, means for automatically stopping the movement of the carriage, means for automatically stopping the movement of the endless flexible member when the card is in the position above the carriage, means for automatically releasing the card from the endless flexible member and depositing it upon the carriage, means for manually effecting a step by step movement of the carriage forwardly, means for automatically starting the movement of the endless flexible member when the carriage has reached a predetermined position, and means for causing the subsequent gripping of the card by the gripping devices carried by the endless flexible member.

7. A card punching device comprising a table having an opening, a carriage movable within the opening and having its top flush with the top of the table, an endless flexible member having a portion arranged to move along the top of the table, a card receptacle, means carried by the endless flexible member for extracting a card one at a time from the receptacle, means carried by said flexible member for gripping the extracted card, means for driving the endless flexible member, means for moving the carriage toward the receptacle, means for automatically stopping the movement of the carriage, means for automatically stopping the movement of the endless flexible member when the card is in the position above the carriage, means for automatically releasing the card from the endless flexible member and depositing it upon the carriage, means for manually effecting a step by step movement of the carriage forwardly, means for automatically starting the movement of the endless flexible member when the carriage has reached a predetermined position, means for causing the subsequent gripping of the card by the gripping devices carried by the endless flexible member, and means for automatically releasing the card from the gripping member and depositing it.

8. In a card punching device, a table having a longitudinal opening in its top, a carriage movable back and forth in said longitudinal opening, the top of the carriage being flush with the top of the table, an endless flexible member having a portion arranged to move along the top of the table, means for driving said endless flexible member, means for causing the simultaneous movement of the carriage in a direction opposite to that of the endless flexible member, means operated by the carriage at the limit of its movement for stopping the movement of the endless flexible member, means for simultaneously disconnecting the carriage from its driving mechanism when the movement of the endless flexible member is stopped, and means for moving the carriage in a reverse direction from its initial movement step by step at will.

9. In a card punching device, a table having a longitudinal opening in its top, a carriage movable back and forth in said longitudinal opening, the top of the carriage being flush with the top of the table, an endless flexible member having a portion arranged to move along the top of the table, means for driving said endless flexible member, means for causing the simultaneous movement of the carriage in a direction opposite to that of the endless flexible member, means operated by the carriage at the limit of its movement for stopping the movement of the endless flexible member, means for simultaneously disconnecting the carriage from its driving mechanism when the movement of the endless flexible member is stopped, means for moving the carriage in a reverse direction from its initial movement step by step at will, and means engaged by the carriage at the limit of its reverse movement for simultaneously starting the endless flexible member and for retracting the carriage.

10. In a card punching device, a table having an elongated longitudinal opening in its top, a carriage disposed in said opening and having its top flush with the top of the table, said carriage being movable back and forth in said opening, a rack carried by the carriage, a pinion engaging said rack, means for operating the pinion to move the carriage, means for disengaging the pinion, means for causing the reverse movement of the carriage manually at will step by step, said last named means comprising a series of pins disposed on said carriage, a pawl having a hook arranged to engage the pins successfully, a pivoted arm, a spring pressed pawl having a tapered end arranged to enter between adjacent pins, said spring pressed pawl having a spring coöperative catch arranged to engage said first named pawl in its movement in one direction to release said pawl from the pin which it engages.

11. In a card punching device, a table having an elongated longitudinal opening in its top, a carriage disposed in said opening and having its top flush with the top of the table, said carriage being movable back and forth in said opening, a rack carried by the carriage, a pinion engaging said rack, means for operating the pinion to move the carriage, means for disengaging the pinion, means for causing the reverse movement of the carriage manually at will step by step, said last named means comprising a series of pins disposed on said carriage, a pawl having a hook arranged to engage the pins successively, a pivoted arm, a spring pressed pawl having a tapered end arranged to enter between adjacent pins, said spring pressed pawl having a spring coöperative catch arranged to engage said first named pawl in its movement in one direction to release said pawl from the pin which it engages, a continued movement of the spring pressed pawl serving to free it from the first named pawl prior to the disengagement of the spring pressed pawl with one of the pins, and a spring for holding the first named pawl in engagement with the pins.

12. In a card punching device, a table having a longitudinal opening in its top, a carriage disposed in said opening and having its top flush with the top of the table, said carriage being movable back and forth in said opening, means for feeding a card upon the carriage at one end of its movement in one direction, and means for advancing the carriage step by step in the other direction.

13. In a card punching device, a table having a longitudinal opening in its top, a carriage disposed in said opening and having its top flush with the top of the table, said carriage being movable back and forth in said opening, means for feeding a card upon the carriage at one end of its movement in one direction, means for advancing the carriage step by step in the other direction, and a series of movable punching devices disposed in fixed relation with respect to the carriage, and means for operating said punching devices selectively.

14. In a card punching device, a table having a longitudinal opening in its top, a carriage disposed in said opening and having its top flush with the top of the table, said carriage being movable back and forth in said opening, means for feeding a card upon the carriage at one end of its movement in one direction, means for advancing the carriage step by step in the other direction, a series of movable punching devices disposed in fixed relation with respect to the carriage, means for operating said punching devices selectively, and automatic means for returning the carriage to the position to receive another card.

JOHN WM. FRITCH.
DELIA E. HOOPES.